United States Patent [19]

Abe

[11] Patent Number: 5,333,306
[45] Date of Patent: Jul. 26, 1994

[54] INFORMATION PROCESSING SYSTEM HAVING A DATA PROTECTION UNIT

[75] Inventor: Fumihiro Abe, Tokyo, Japan

[73] Assignee: NEC Corporation, Tokyo, Japan

[21] Appl. No.: 826,805

[22] Filed: Jan. 28, 1992

[30] Foreign Application Priority Data

Jan. 29, 1991 [JP] Japan .................................. 3-026687

[51] Int. Cl.⁵ .............................................. G06F 11/00
[52] U.S. Cl. .................................. 395/575; 371/163; 364/246.8; 364/DIG. 1
[58] Field of Search .............. 395/575; 371/16.3, 51.1, 371/59, 61, 62; 364/246.8

[56] References Cited

U.S. PATENT DOCUMENTS

| | | | |
|---|---|---|---|
| 3,594,732 | 7/1971 | Mendelson et al. | 340/172.5 |
| 4,489,380 | 12/1984 | Carey et al. | 364/200 |
| 4,578,774 | 3/1986 | Muller | 371/62 |
| 4,631,701 | 12/1986 | Kappeler et al. | 395/575 |
| 4,747,048 | 5/1988 | Mueller | 364/300 |
| 4,751,633 | 6/1988 | Henn et al. | 364/200 |
| 5,007,014 | 4/1991 | Nishimura | 371/16.3 |
| 5,036,460 | 7/1991 | Takahira et al. | 364/200 |
| 5,199,032 | 3/1993 | Sparks et al. | 371/3 |
| 5,249,298 | 9/1993 | Bolan et al. | 395/750 |

*Primary Examiner*—Robert W. Beausoliel, Jr.
*Assistant Examiner*—Joseph E. Palys
*Attorney, Agent, or Firm*—Foley & Lardner

[57] ABSTRACT

In an information processing system comprising a central processing unit connected to a bus for carrying out data processing in accordance with a program and a main memory unit connected to the bus for memorizing data, a data protection unit is connected to the bus. The data protection unit protects the data in the main memory unit from destruction by supplying the main memory unit with a write inhibit signal when the program runs away.

1 Claim, 3 Drawing Sheets

INFORMATION PROCESSING SYSTEM HAVING A DATA PROTECTION UNIT

BACKGROUND OF THE INVENTION

This invention relates to an information processing unit comprising a central processing unit and a main memory unit and, in particular, to a data protection unit for protecting data in the main memory unit when a program for the central processing unit runs away.

As well known in the art, an information processing unit comprises a bus, a central processing unit (CPU), and a main memory unit (MMU). The central processing unit and the main memory unit are connected to the bus. The central processing unit carries out data processing in accordance with a program. The main memory unit memorizes data. The information processing unit may comprise a data channel. Each of the central processing unit and the data channel accesses the main memory unit. Therefore, each of the central processing unit and the data channel will be called a memory accessing unit for accessing the main memory unit. When the program runs away or has bugs, it is likely that destruction of the data occurs in the main memory unit. In order to permit protection of the data in the main memory unit from such destruction, the information processing unit comprises a protection facility.

A conventional protection facility comprises key register circuits which are mounted on the central processing unit and the data channel, respectively, and a lock register circuit mounted on the main memory unit. Each key register circuit is connected to the bus and comprises a plurality of key registers. The key registers hold key values each of which has one of logic zero and one values. The key values are initially set in the key registers by the program. The lock register circuit is connected to the bus and comprises a plurality of lock registers and a comparator. The lock registers hold lock values each of which is equal to one of logic zero and one values. The lock values are also initially set in the lock registers by the program. The comparator compares the key values held in the key registers with the lock values held in the lock registers. When a combination of the key values and the lock values satisfies a predetermined condition, the comparator produces a match signal. In this event, access to the main memory unit by the memory accessing unit is granted. In other words, the memory accessing unit may write the data in the main memory unit. Otherwise, the comparator produces a mismatch signal. Under the circumstances, access to the main memory unit by the memory accessing unit is prohibited.

In the conventional protection facility, the main memory unit has a memory space which is divided into a plurality of blocks and each block is assigned with a peculiar lock value and a peculiar key value. As a result, the main memory unit is protected from destruction of the data therein when the program runs away or has bugs. It is assumed that the memory accessing unit writes the data in the main memory unit when the program runs away. Under the circumstances, the data in the main memory unit is continuously destructed by the memory accessing unit until the memory accessing unit is reset in the conventional protection facility.

SUMMARY OF THE INVENTION

It is an object of this invention to provide an information processing unit having a data protection unit which is capable of protecting data in a main memory unit from destruction even though a memory accessing unit writes the data in the main memory unit on running away of a program.

Other objects of this invention will become clear as the description proceeds.

According to an aspect of this invention, an information processing unit comprises a bus. Connected to the bus, a central processing unit carries out data processing in accordance with a program. Connected to the bus, a main memory unit memorizes data. Connected to the bus, a data protection unit protects the data in the main memory unit from destruction by supplying the main memory unit with a write inhibit signal when the program runs away.

DESCRIPTION OF THE PREFERRED EMBODIMENT

Figure 1:
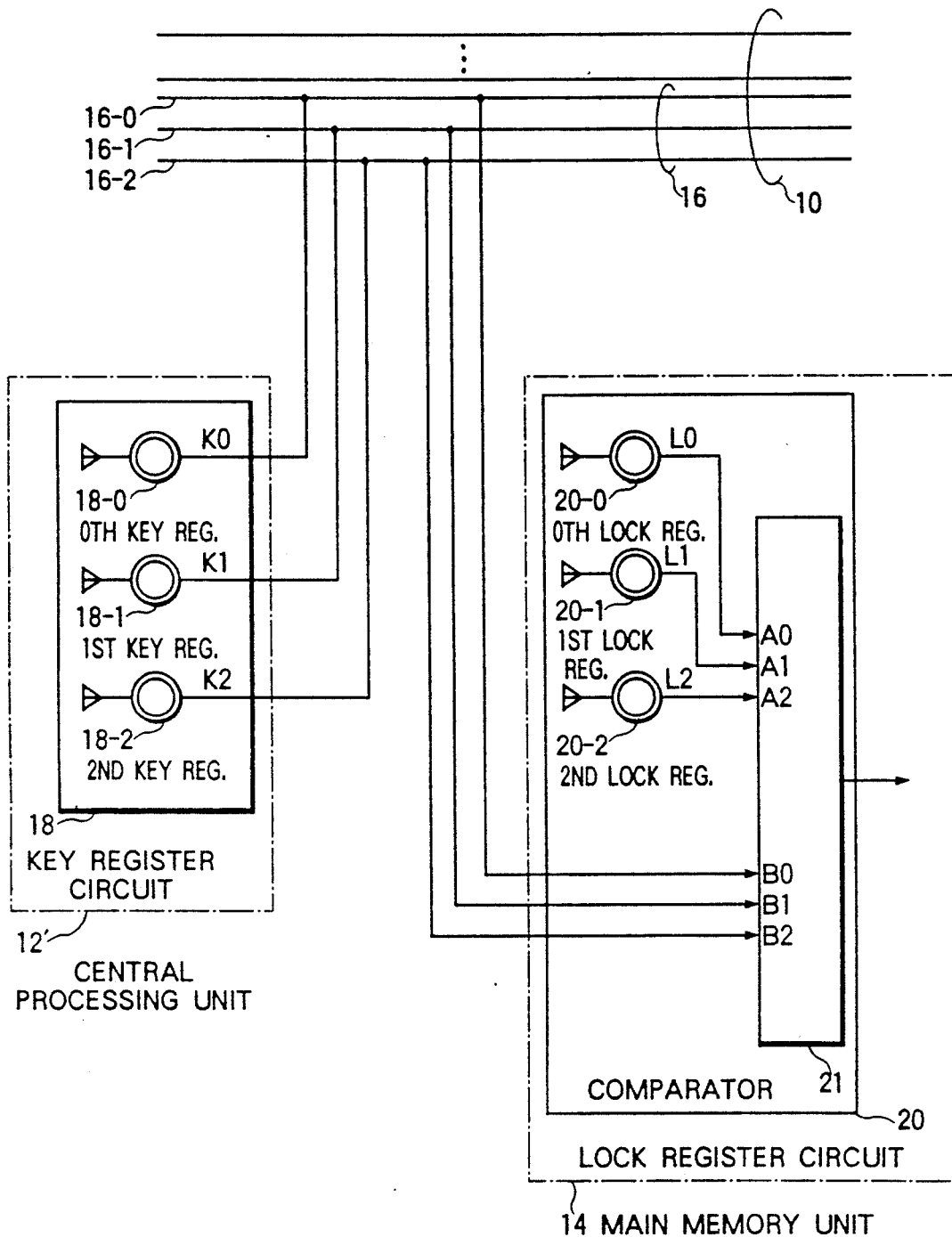
FIG. 1 is a block diagram of a conventional information processing system.

Referring to FIG. 1, a conventional information processing system will be described at first in order to facilitate an understanding to the present invention.

The information processing unit comprises a bus 10, a central processing unit (CPU) 12', and a main memory unit (MMU) 14. The central processing unit 12' and the main memory unit 14 are connected to the bus 10. The central processing unit 12' carries out data processing in accordance with a program. The main memory unit 14 memorizes data. The information processing unit may comprise a data channel (not shown). Each of the central processing unit 12' and the data channel accesses the main memory unit 14. Therefore, each of the central processing unit 12' and the data channel is called a memory accessing unit for accessing the main memory unit 14. When the program runs away or has bugs, it is likely that destruction of the data occurs in the main memory unit 14. In order to permit protection of the data in the main memory unit 14 from destruction, the information processing unit comprises a protection facility.

In the example being illustrated, the bus 10 includes a key address bus 16 which comprises zeroth through second key address lines 16-0, 16-1, and 16-2.

The protection facility comprises a key register circuit 18 and a lock register circuit 20. The key register circuit 18 is mounted on the central processing unit 12'. Another register circuit (not shown) may be mounted on the data channel. The lock register circuit 20 is mounted on the main memory unit 14.

The key register circuit 18 is connected to the key address bus 16. In the example being illustrated, the key register circuit 18 comprises zeroth through second key registers 18-0, 18-1, and 18-2. The zeroth through the second key registers 18-0 to 18-2 hold zeroth through second key values K0, K1, and K2, respectively. The zeroth through the second key registers 18-0 to 18-2 are connected to the zeroth through the second key address lines 16-0 to 16-2, respectively. Each of the zeroth through the second key values K0 to K2 is equal to one of logic zero and one values. Herein, the logic zero value is also referred to as a reset value, while the logic one value is also called a set value. The zeroth through the second key values K0 to K2 are initially set in the zeroth through the second key registers 18-0 to 18-2 by the program, respectively.

The lock register circuit 20 is connected to the key address bus 16. In the example being illustrated, the lock register circuit 20 comprises zeroth through second lock registers 20-0, 20-1, and 20-2 and a comparator 21. The zeroth through the second lock registers 20-0 to 20-2 hold zeroth through second lock values L0, L1, and L2, respectively. Each of the zeroth through the second lock values L0 to L2 has one of logic zero and one values. The zeroth through the second lock values L0 to L2 are also initially set in the zeroth through the second lock registers 20-0 to 20-2 by the program, respectively.

In the example being illustrated, the comparator 21 has zeroth through second primary input terminals A0, A1, and A2 and zeroth through second subsidiary input terminals B0, B1, and B2. The zeroth through the second primary input terminals A0 to A2 are connected to the zeroth through the second lock registers 20-0 to 20-2, respectively. Therefore, the zeroth through the second primary input terminals A0 to A2 are supplied with the zeroth through the second lock values L0 to L2, respectively. The zeroth through the second subsidiary input terminals B0 to B2 are connected to the zeroth through the second key registers 18-0 to 18-2 via the zeroth through the second key address lines 16-0 to 16-2, respectively. Therefore, the zeroth through the second subsidiary input terminals B0 to B2 are supplied with the zeroth through the second key values K0 to K2, respectively.

The comparator 21 compares the zeroth through the second key values K0 to K2 with the zeroth through the second lock values L0 to L2. In the manner which will later be described, the comparator 21 produces a match signal when a combination of the zeroth through the second key values K0 to K2 and the zeroth through the second lock values L0 to L2 satisfies a predetermined condition. In this event, access to the main memory unit 14 by the memory accessing unit is granted. In other words, the memory accessing unit may write the data in the main memory unit 21. Otherwise, the comparator 14 produces a mismatch signal. Under the circumstances, access to the main memory unit 14 by the memory accessing unit is prohibited.

Table 1, below, shows a match pattern of the comparator 14. In Table 1, rows represent the zeroth through the second key values K0 to K2 while columns represent the zeroth through the second lock values L0 to L2. In Table 1, each mark labelled "M" represents that the predetermined condition is satisfied, while each blank represents that the predetermined condition is unsatisfied.

TABLE 1

|    |    |    | L2 | 0 | 0 | 0 | 0 | 1 | 1 | 1 | 1 |
|    |    |    | L1 | 0 | 0 | 1 | 1 | 0 | 0 | 1 | 1 |
| K2 | K1 | K0 | L0 | 0 | 1 | 0 | 1 | 0 | 1 | 0 | 1 |
| 0 | 0 | 0 |    |   |   |   |   |   |   |   |   |
| 0 | 0 | 1 |    |   | M |   |   |   |   |   | M |
| 0 | 1 | 0 |    |   |   |   | M |   |   |   | M |
| 0 | 1 | 1 |    |   |   |   |   | M |   |   | M |
| 1 | 0 | 0 |    |   |   |   |   |   | M |   | M |
| 1 | 0 | 1 |    |   |   |   |   |   |   | M | M |
| 1 | 1 | 0 |    |   |   |   |   |   |   | M | M |

TABLE 1-continued

|    |    |    | L2 | 0 | 0 | 0 | 0 | 1 | 1 | 1 | 1 |
|    |    |    | L1 | 0 | 0 | 1 | 1 | 0 | 0 | 1 | 1 |
| K2 | K1 | K0 | L0 | 0 | 1 | 0 | 1 | 0 | 1 | 0 | 1 |
| 1 | 1 | 1 |    | M | M | M | M | M | M | M | M |

As apparent from Table 1, the comparator 21 produces the match signal when all of the zeroth through the second key values K0 to K2 are equal to the logic one values, namely, the set values regardless of the zeroth through the second lock values L0 to L2. In addition, the comparator 21 produces the match signal when the zeroth through the second key values K0 to K2 are equal to the zeroth through the second lock values L0 to L2, respectively, with the exception that all of the zeroth through the second key values K0 to K2 are equal to the logic zero values or the reset values. Furthermore, the comparator 21 produces the match signal when all of the zeroth through the second lock values L0 to L2 equal to the logic one Values, namely, the set values, and when any one of the zeroth through the second key values K0 to K2 is equal to the logic one value or the set value.

On the other hand, the comparator 21 produces the mismatch signal when all of the zeroth through the second key values K0 to K2 are equal to the logic zero values or the reset values regardless of the zeroth through the second lock values L0 to L2. It is therefore noted that the memory accessing unit such as the central processing unit 12' can not write the data in the main memory unit 14 when all of the zeroth through the second key values K0 to K2 are equal to the reset values.

In the above-mentioned conventional protection facility, the main memory unit 14 has a memory space which is divided into a plurality of blocks. Each block is assigned with a peculiar lock value and a peculiar key value. As a result, the main memory unit 14 is protected from destruction of the data therein when the program runs away or has bugs. However, the conventional protection facility is defective in that it is impossible to protect the data in the main memory unit 14 from destruction until the memory accessing unit is reset when the memory accessing unit writes the data in the main memory unit 14 on running away of the program, as mentioned in the preamble of the instant specification.

Figure 2:
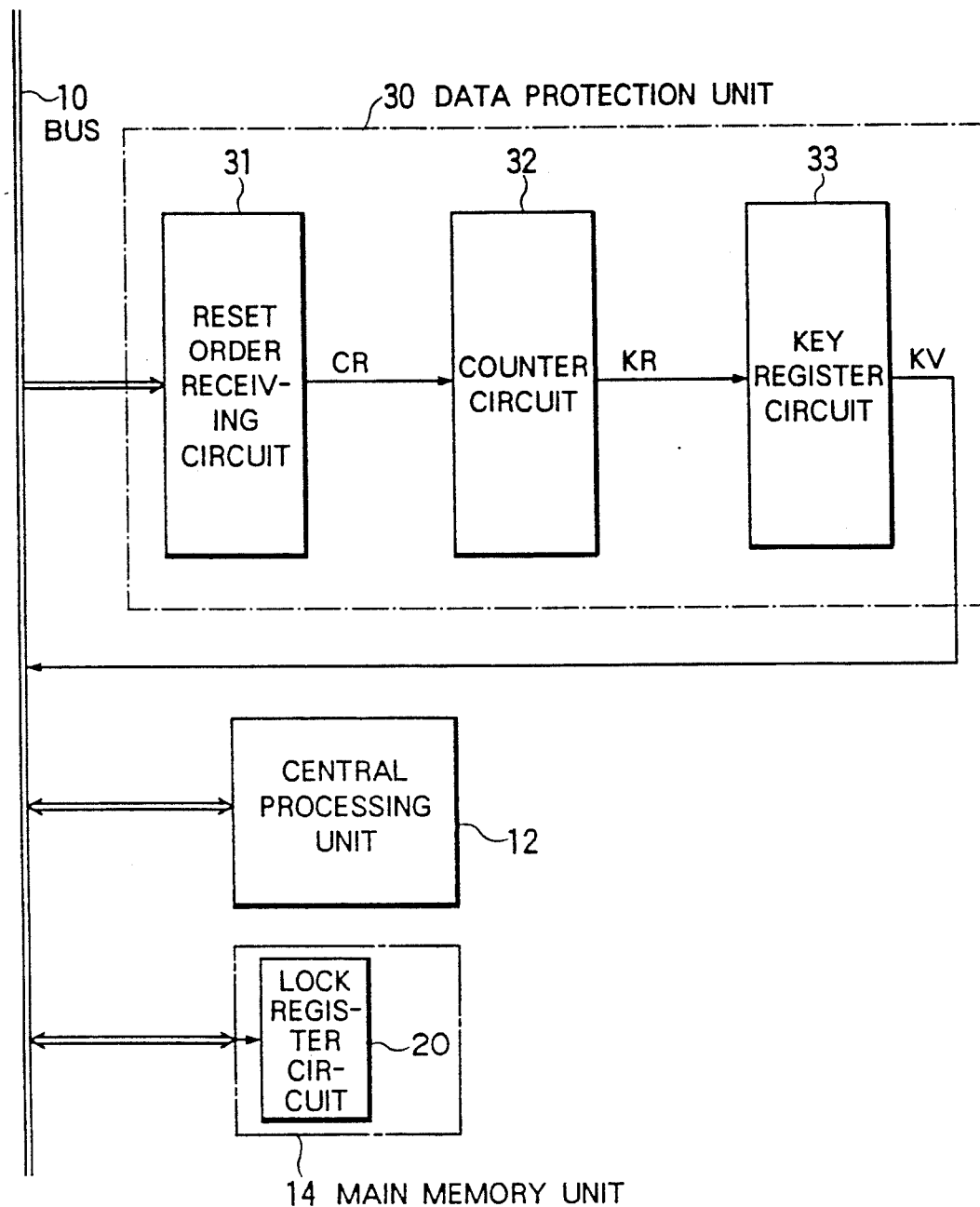
FIG. 2 is a block diagram of an information processing system according to a preferred embodiment of the instant invention.

Referring to FIG. 2, the description will proceed to an information processing system according to a preferred embodiment of this invention. The information processing system is similar in structure and operation to the conventional information processing system illustrated in FIG. 1 except that the information processing system further comprises a data protection unit 30 and a central processing unit 12 does not mount the key register circuit on.

The data protection unit 30 is connected to the bus 10. In the manner which will later be described, the data protection unit 30 protects the data in the main memory unit 14 from destruction by supplying the main memory unit 14 with a write inhibit signal when the program runs away.

The central processing unit 12 periodically produces a reset order signal as long as the central processing unit 12 normally operates. Production of the reset order signal is carried out by the program. The reset order signal has a predetermined period of, for example, eight milliseconds.

The data protection unit 30 comprises a reset order receiving circuit 31, a counter circuit 32, and a key register circuit 33 which is similar in structure and operation to the key register circuit 18 illustrated in FIG. 1.

The reset order receiving circuit 31 is connected to the bus 10. The reset order receiving circuit 31 receives the reset order signal to produce a count reset signal CR whenever the reset order receiving circuit 31 receives the reset order signal.

The counter circuit 32 is connected to the reset order receiving circuit 31. The counter circuit 32 carries out count operation independent of operation defined by the program. The counter circuit 32 is reset in response to the count reset signal CR. When the counter circuit 32 is not supplied with the count reset signal CR during a predetermined time interval of, for example, twenty-four milliseconds, the counter circuit 32 overflows. The counter circuit 32 produces a key reset signal KR when the counter circuit 32 overflows.

The key register circuit 33 is connected to the bus 10 and the counter circuit 32. The key register circuit 33 holds key values KV. The key register circuit 33 is reset in response to the key reset signal KR thereby to produce the key values KV equal to the reset values as the write inhibit signal.

The key values KV are, for example, equal to the zeroth through the second key values K0 to K2 as mentioned above in conjunction with FIG. 1. The key values KV are supplied to the lock register circuit 20 via the bus 10. Therefore, the memory accessing unit such as the central processing unit 12 can not write the data in the main memory unit 14 when the write inhibit signal is produced by the key register circuit 33.

Figure 3:
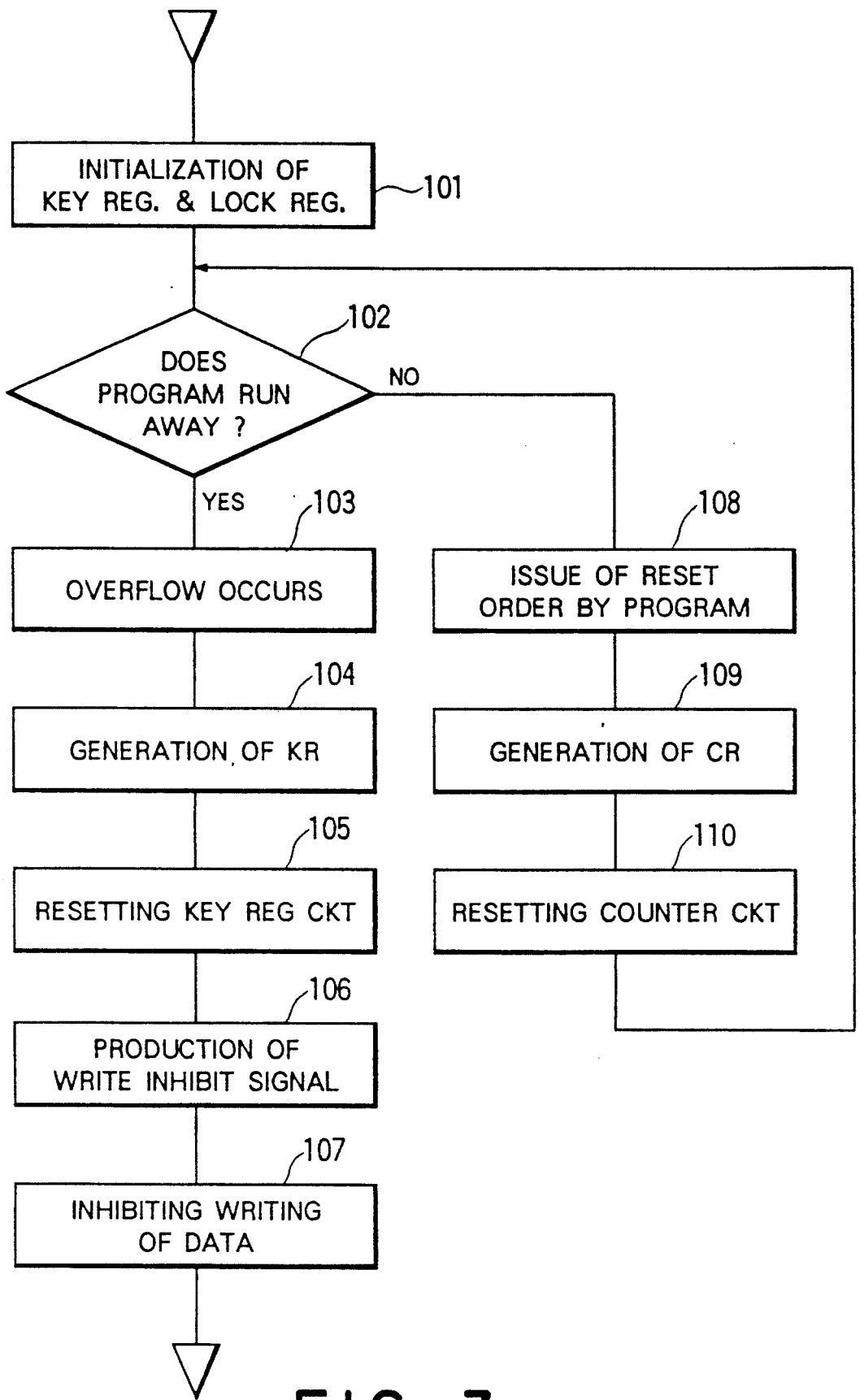
FIG. 3 shows a flow chart for use in describing operation of the information processing system illustrated in FIG. 2.

Referring to FIG. 3 in addition to FIG. 2, description will be made as regards operation of the information processing system illustrated in FIG. 2.

At first, initialization for the key register circuit 33 and the lock register circuit 20 is carried out (a step 101).

When the program of the central processing unit 12 runs away (Yes of a step 102), the central processing unit 12 does not produce the reset order signal. As a result, the counter circuit 32 overflows (a step 103) and generates the key reset signal KR (a step 104). Responsive to the key reset signal KR, the key register circuit 33 is reset (a step 105) to produce the write inhibit signal (a step 106). Accordingly, writing of the data to the main memory unit 14 is inhibited (a step 107) to protect the data in the main memory unit 14 from destruction.

While the program of the central processing unit 12 normally operates (No of the step 102), the central processing unit. 12 periodically produces the reset order signal by the program (a step 108). The reset order signal is delivered to the reset order receiving circuit 31 via the bus 10. Responsive to the reset order signal, the reset order receiving circuit 31 generates the count reset signal CR (a step 109). Responsive to the count reset signal CR, the counter circuit 32 is reset (a step 110) so that the counter circuit 32 does not overflow.

What is claimed is:

1. An information processing system, comprising:
a bus;
a central processing unit connected to said bus for carrying out data processing in accordance with a program, producing a reset order signal as long as said central processing unit normally operates;
a main memory unit connected to said bus for memorizing data; and
a data protection unit, connected to said bus for protecting the data in said main memory unit from destruction by supplying said main memory unit with a write inhibit signal when said program runs away, said data protection unit comprising:
a reset order receiving circuit connected to said bus for receiving said reset order signal, said reset order receiving circuit producing a count reset signal whenever it receives said reset order signal;
a counter circuit, connected to said reset order receiving circuit, for carrying out count operation independent of the operation of said program, said counter circuit being reset in response to said count reset signal and producing a key reset signal when said counter circuit overflows; and
a key register circuit connected to said bus and said counter circuit for holding key values, said key register circuit being reset in response to said key reset signal, thereby producing key values equal to said write inhibit signal.

* * * * *